United States Patent
Yasuda et al.

(10) Patent No.: US 8,569,924 B2
(45) Date of Patent: Oct. 29, 2013

(54) ROTATING ELECTRIC MACHINE AND COMPRESSOR

(75) Inventors: Yoshiki Yasuda, Kusatsu (JP); Akio Yamagiwa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 267 days.

(21) Appl. No.: 12/598,303

(22) PCT Filed: Apr. 23, 2008

(86) PCT No.: PCT/JP2008/057865
§ 371 (c)(1),
(2), (4) Date: Oct. 30, 2009

(87) PCT Pub. No.: WO2008/139873
PCT Pub. Date: Nov. 20, 2008

(65) Prior Publication Data
US 2010/0135830 A1    Jun. 3, 2010

(30) Foreign Application Priority Data
May 1, 2007   (JP) ................................. 2007-120814

(51) Int. Cl.
H02K 1/16    (2006.01)
H02K 1/26    (2006.01)

(52) U.S. Cl.
USPC ...... 310/216.069; 310/216.073; 310/216.074; 310/216.097; 310/40 R; 310/216.136

(58) Field of Classification Search
USPC .......... 310/216.136, 216.069, 40 R, 216.073, 310/216.074, 216.097
See application file for complete search history.

(56) References Cited

U.S. PATENT DOCUMENTS

| | | | | |
|---|---|---|---|---|
| 1,756,672 A * | 4/1930 | Barr | ....................... | 310/216.078 |
| 2,236,291 A * | 3/1941 | Kilbourne | ............. | 310/216.061 |
| 4,827,164 A * | 5/1989 | Horber | ........................ | 310/49.37 |
| 5,359,249 A * | 10/1994 | Tanaka | ................... | 310/216.069 |
| 2001/0005104 A1 * | 6/2001 | Nakahara et al. | ............. | 310/216 |
| 2003/0201687 A1* | 10/2003 | Asai | ............................... | 310/214 |
| 2006/0125341 A1* | 6/2006 | Rau et al. | ...................... | 310/254 |

FOREIGN PATENT DOCUMENTS

| | | |
|---|---|---|
| JP | 55-53935 U | 4/1980 |
| JP | 61-81148 A | 4/1986 |
| JP | 09-046937 A | 2/1997 |
| JP | 2000-350390 A | 12/2000 |

(Continued)

OTHER PUBLICATIONS

Korean Office Action of corresponding Korean Application No. 10-2009-7019693 dated Jan. 13, 2011.

*Primary Examiner* — Tran Nguyen
*Assistant Examiner* — Alex W Mok
(74) *Attorney, Agent, or Firm* — Global IP Counselors (57) ABSTRACT

A rotating electric machine includes a case, a plurality of teeth, coils and insulating films. The teeth are circumferentially arranged around a predetermined axis forming a center of the teeth. Each tooth has a first end disposed radially at an opposite side thereof from the predetermined axis. The a back yoke has a circular outer periphery, and a cylindrical inner periphery connecting the first ends of the teeth. The outer periphery has a plurality of concave parts opening radially inwardly toward the teeth at positions overlapping with the teeth as viewed radially. A minimum distance measured from an exposure surface of each tooth to the concave part overlapping therewith is smaller than a radial width of the back yoke at a portion where the concave parts are not provided. The exposure surfaces extend radially inwardly of the inner periphery.

15 Claims, 4 Drawing Sheets

(56) References Cited

FOREIGN PATENT DOCUMENTS

| | | |
|---|---|---|
| JP | 2001-012374 A | 1/2001 |
| JP | 2001-268824 A | 9/2001 |
| JP | 2002-101579 A | 4/2002 |
| JP | 2002-142390 A | 5/2002 |
| JP | 2003-032985 A | 1/2003 |
| JP | 2003-343439 A | 12/2003 |
| JP | 2004-346757 A | 12/2004 |
| JP | 2005-080418 A | 3/2005 |
| JP | 2005-245101 A | 9/2005 |
| JP | 2006-238507 A | 9/2006 |
| JP | 2007006636 A * | 1/2007 |

* cited by examiner

ROTATING ELECTRIC MACHINE AND COMPRESSOR

CROSS-REFERENCE TO RELATED APPLICATIONS

This U.S. National stage application claims priority under 35 U.S.C. §119(a) to Japanese Patent Application No. 2007-120814, filed in Japan on May 1, 2007, the entire contents of which are hereby incorporated herein by reference.

TECHNICAL FIELD

The present invention relates to a rotating electric machine and a compressor, and specifically relates to a rotating electric machine with coils wound by concentrated-winding.

BACKGROUND ART

A compressor in which a compression mechanism compressing a refrigerant and an electric motor driving the compression mechanism are integrally housed in a case, is disclosed in Japanese Patent Application Laid-Open Nos. 2001-268824, 2005-245101 and 2003-32985. In any of these Patent Documents, a notch is provided on the periphery of a stator in an electric motor, and the electric motor and the case are fixed by shrink-fitting, etc. at a portion where the periphery of the stator abuts against an inner periphery of the case. A refrigerant is transferred to the compression mechanism through the notch. Coils are wound around teeth of the stator with an insulating film interposed therein.

SUMMARY OF THE INVENTION

Problems to be Solved by the Invention

When a refrigerant is a carbon dioxide refrigerant, pressure thereof is generally high, and the stator and case are fixed by welding. When the stator and case are welded, heat by welding is transferred to the teeth. Then, when the coils are wound around the teeth by concentrated-winding, the insulating film is urged to a side of the teeth, so that there is a possibility of damaging the insulating film at the teeth side.

It is therefore an object of the present invention to provide a rotating electric machine suppressing heat damage of the insulating film.

Means for Solving the Problems

A first aspect of a rotating electric machine of the invention includes: a plurality of teeth (21) radially arranged with a predetermined axis (P) as a center and each having one end (210) at the opposite side of the axis in a radial direction with the axis as a center; a back yoke (22) having a circular periphery (220) and a cylindrical inner periphery (222) connecting each one end and where a plurality of concave parts (221) opening toward the opposite side of the axis with respect to the radial direction are provided in the periphery at positions overlapping with the teeth as seen along the radial direction; coils (30) wound around the teeth with concentrated-winding; insulating films (40) each interposed among each of the teeth, the back yoke, and the coil; a case (10) fixed to the back yoke by welding between adjacent two of the plurality of concave parts in the periphery, wherein a minimum distance (B) from an exposure surface (213) of each of the teeth exposed outside to the concave part is smaller than a width (A) in the radial direction at a portion in the back yoke where the concave part is not provided.

According to a second aspect of the rotating electric machine of the invention, in the first aspect of the rotating electric machine, bases (214) of the teeth (21) at a side of the back yoke (22) are arc-shaped, and a center of the arc is located between the teeth (21) in a circumferential direction with the axis as a center.

According to a third aspect of the rotating electric machine of the invention, in the first aspect of the rotating electric machine, bases (214) of the teeth (21) at a side of the back yoke (22) are chamfered.

According to a fourth aspect of the rotating electric machine of the invention, in the first aspect of the rotating electric machine, bases (214) of the teeth (21) at a side of the back yoke (22) are arc-shaped, and the arc is protruding.

According to a fifth aspect of the rotating electric machine of the invention, in the first aspect of the rotating electric machine, bases (214) of the teeth (21) at a side of the back yoke (22) are staircase shaped.

According to a sixth aspect of the rotating electric machine of the invention, in any of the first to fifth aspects of the rotating electric machine, an absolute value (F) of the minimum value of a difference between a length from other end (211) of each of the teeth (21) in the radial direction to the concave part (221), and a length from the other end to the one end (210) in the radial direction is 1.5 mm and above.

According to a seventh aspect of the rotating electric machine of the invention, in any of the first to sixth aspects of the rotating electric machine, the concave part (221) smoothly continues to the periphery (220) where the concave part is not provided in the circumferential direction with the axis (P) as a center.

A first aspect of a compressor of the invention includes: a compression mechanism for compressing a refrigerant, and a rotating electric machine (1) according to any one of the first to seventh aspects for driving the compression mechanism by the refrigerant flowing through the concave part (221) to the compression mechanism, wherein a surface of the concave part perpendicular to the axis is semicircular, and the diameter ($2 \cdot R$) of the semicircle is larger than a width (T) of each of the teeth (21) in the circumferential direction with the axis as a center.

Effects of the Invention

In the rotating electric machine with coils wound around by concentrated-winding, the contact between the insulating films and teeth is stronger than that between the insulating films and the back yoke. That is, when the back yoke and the case are fixed by welding, the insulating films at the teeth side are highly likely to be damaged by heat transferred from a welding point to inside the back yoke. According to the first aspect of the rotating electric machine of the invention, the minimum distance between the exposure surface of each of the teeth and the concave part is small, so that the heat transferred to the teeth is reduced, thereby suppressing the heat damage of the insulating films.

According to the second aspect of the rotating electric machine of the invention, magnetic flux passing along the shape of the base becomes smooth, thereby suppressing increase of iron loss.

According to the third aspect of the rotating electric machine of the invention, copper loss is reduced.

According to the fourth aspect of the rotating electric machine of the invention, magnetic path is expanded, thereby preventing magnetic saturation.

According to the fifth aspect of the rotating electric machine of the invention, coils are wound by regular winding, thereby improving the space factor.

According to the sixth aspect of the rotating electric machine of the invention, coils are easily fixed.

According to the seventh aspect of the rotating electric machine of the invention, stress applied to the back yoke is reduced, thereby providing the rotating electric machine with high reliability.

According to the first aspect of the compressor of the invention, the increase of a sectional area of the concave part allows the refrigerant to easily pass through. While there may be a case where a through hole is provided as a refrigerant flow channel in a rotator disposed to oppose to each of the teeth, according to the compressor of the invention, such a through hole is unnecessary, thereby reducing the production cost.

These and other objects, features, aspects and advantages of the present invention will become more apparent from the following detailed description of the present invention when taken in conjunction with the accompanying drawings.

DETAILED DESCRIPTION OF THE INVENTION

Preferred Embodiment

Figure 1:
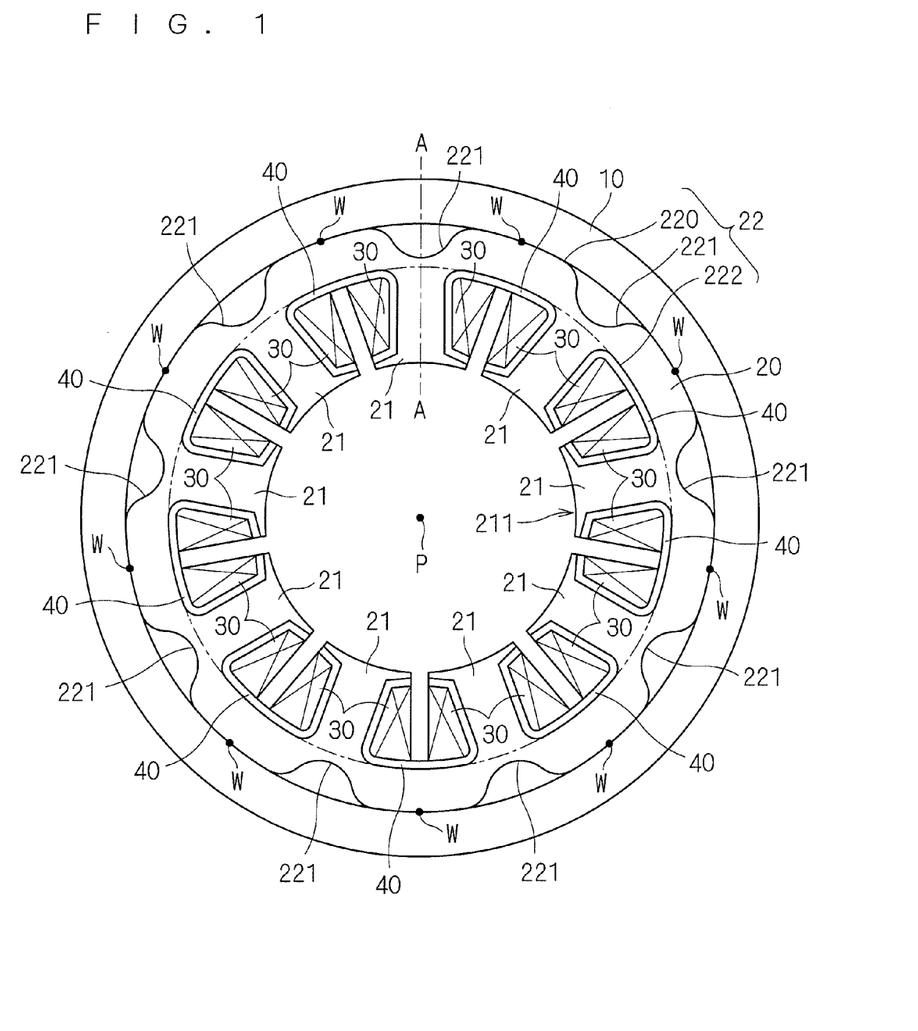
FIG. 1 is a conceptual diagram of a rotating electric machine according to a preferred embodiment.

A rotating electric machine according to a preferred embodiment of the invention will be described. FIG. 1 is a conceptual diagram of a cross section of the rotating electric machine perpendicular to a rotation axis P.

The rotating electric machine 1 includes a case 10, a stator core 20, coils 30, and insulating films 40.

The stator core 20 includes a plurality of teeth 21, and a back yoke 22. The plurality of teeth 21 are radially disposed with the rotation axis P as a center, and includes one end at the opposite side of the rotation axis P in a radial direction with the rotation axis P as a center. In FIG. 1, nine teeth 21 are illustrated.

The back yoke 22 includes a circular periphery 220, and a cylindrical inner periphery 222 connecting the aforementioned one ends. A plurality of concave parts (referred to as notches, hereinafter) 221 opening toward the opposite side of the rotation axis P with respect to the radial direction are provided in the periphery 220 at positions overlapping with the nine teeth 21 in the radial direction, respectively. That is, each of the notches 221 is provided for each of the teeth 21. In this case, the notches 221 are unlikely to block the magnetic path coupling the teeth 21 through the back yoke 22, thereby suppressing the magnetic saturation of the teeth 21.

In FIG. 1, the notches 221 each having a substantially semicircular shape in a surface perpendicular to the rotation axis P are illustrated. In a circumferential direction with the rotation axis P as a center, the notches 221 smoothly continue to the periphery 220 where the notches 221 are not provided. This is not an essential condition, but this allows the stress applied to the back yoke 22 to be reduced, thereby providing a rotating electric machine with high reliability. More specifically, each concave part of each notch 221 is bordered on its circumferential sides by two concave parts. As can be understood from FIG. 2, each notch 221 is concave up to an inflection point Y, past which the surface forms a convex part which extends up to an inflection point X, past which the surface continues as the periphery 220. In other words, the inflection point X represents the transition point between the periphery 220 and the convex part, and the inflection point Y represents the transition point between the convex art and the concave art. The inflection point X between the first convex part and the periphery 220 is circumferentially spaced from the inflection point Y between the concave part and the first convex part with respect to a single circumferential side of a radial center line of the tooth circumferentially aligned with the concave part.

The coils 30 are wounded around each of the teeth 21 through the insulating film 40 with concentrated-winding. While it is not shown in FIG. 1, an insulator (later described) for preventing winding collapse of the coils 30 is disposed at one end or both ends of the teeth 21 in a direction parallel to the rotation axis P. The insulating films 40 are interposed between the teeth 21 and the coils 30, and between the back yoke 22 and the coils 30.

The case 10 has, for example, a cylindrical shape, and houses the stator core 20, the coils 30, and the insulating films 40. Then, a rotator not shown is disposed to oppose to the teeth 21 in a region including the rotation axis P, driving the compression mechanism not shown by the rotation of the rotator. The rotator and the compression mechanism are housed in the case 10, and a carbon dioxide refrigerant flows into the compression mechanism with the notch 221 as a channel. The compression mechanism compresses the carbon dioxide refrigerant. This configuration makes a refrigerant compressor possible.

Since inner pressure is high in the refrigerant compressor using the carbon dioxide refrigerant, the inner periphery of the case 10 and the periphery of the stator core 20 are fixed by welding, more specifically, abutting against the inner periphery of the case 10 between adjacent two of the notches 221, respectively, in the periphery 220 of the back yoke 22. Then, the case 10 and the back yoke 22 are welded (e.g., spot welding) at each position abutted (referred to as a welding point W, hereinafter). That is, they are welded at positions which are rotationally symmetric with the rotation axis P as a center.

In the rotating electric machine 1 having the above configuration, since the coils 30 are wound around the teeth 21 with concentrated-winding, while the insulating films 40 are urged to a side of the teeth 21 by the coils 30, they are hardly urged to the side of the back yoke 22. That is, the contact between the insulating films 40 and the teeth 21 is more preferable than that between the insulating films 40 and the back yoke 22.

Namely, referring to FIG. 1, when the stator core 20 and the case 10 are fixed by welding, heat generated from the welding point W is transferred to the teeth 21 through an inside of the back yoke 22, possibly causing a damage on the insulating films 40 in a portion making contact with the teeth 21.

Figure 2:
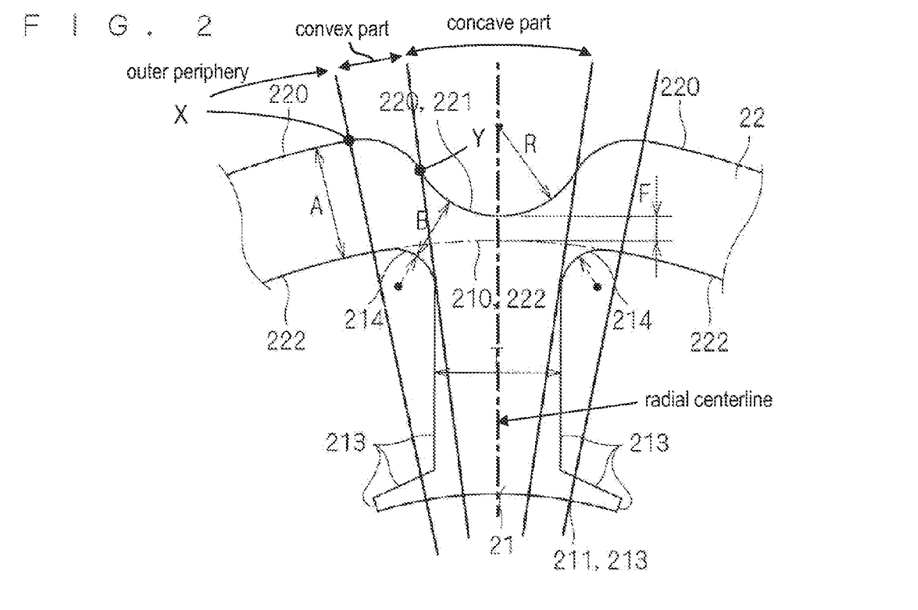
FIG. 2 is a diagram of an enlarged portion corresponding to one of the teeth in a stator core.

The present preferred embodiment has the configuration in which the heat from the welding point W is difficult to be transferred to the teeth 21. This will be described more specifically, referring to FIG. 2. FIG. 2 is a conceptual diagram of the enlarged vicinity of one of the teeth 21 in the stator core 20 shown in FIG. 1. As shown in FIG. 2, a minimum distance B from bases 214 of each of the teeth 21 at a side of the back yoke 22 to the notch 221 is smaller than a width A in the radial direction at a portion in the back yoke 22 where the notch 221 is not provided. The minimum distance B is understood as the minimum distance from the exposure surface 213 of each of the teeth 21 exposed outside to the notch 221.

Here, considering that, generally, heat resistance=(a length of a direction to which the heat is transferred)/(an area perpendicular to the direction to which the heat is transferred)/(heat conductivity which is a value specific to a substance), a sectional area of a portion (portion of the minimum distance B) where the heat is transferred to the teeth 21 is smaller than that of the back yoke 22 when the heat generated by welding is transferred inside the back yoke 22, thereby increasing the heat resistance in this portion. Therefore, the heat transferred to the teeth 21 is reduced, thereby suppressing the heat damage on the insulating films 40 making contact with the teeth 21.

In FIG. 2, each of the bases 214 has an arc shape, and the center of the arc is between the teeth 21 adjacent to each other in the circumferential direction. In this shape, magnetic flux generated in the teeth 21 is transferred smoothly to the back yoke 22 along the bases 214, thereby reducing iron loss of the stator core 20.

The diameter (2·R) of the notches 221 is desirably larger than a width T of each of the teeth 21 in the circumferential direction. In this case, the refrigerant easily passes through the notches 221. While, generally, there may be a case where a through hole for letting the refrigerant pass through a rotator not shown is provided, the refrigerant can be passed through sufficiently by the notches 221, so that such a through hole is unnecessary. Thus, the increase of production cost is avoided.

Figure 3:
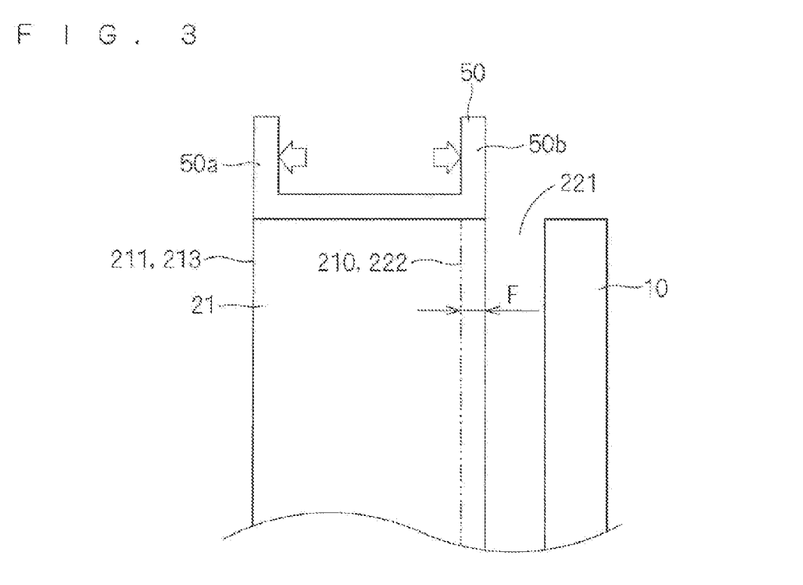
FIG. 3 is a sectional view of the rotating electric machine shown in FIG. 1 taken along a line A-A.

FIG. 3 is a sectional view of the rotating electric machine shown in FIG. 1 taken along a line A-A. As shown in FIG. 3, an insulator 50 is disposed at least one end of each of the teeth 21 in a direction parallel to the rotation axis P. The insulator 50 is formed of, for example, resin, and has a shape to hold the coils 30 in the radial direction. For instance, as shown in FIG. 3, the insulator 50 includes protrusion parts 50a and 50b extending in a direction parallel to the rotation axis P at both ends of each of the teeth 21, thereby preventing the coils 30 from collapsing.

In order to ensure a channel for the refrigerant, the insulator 50 is disposed at a position not overlapping with the notch 221 in the direction parallel to the rotation axis P. Further, the distance between the protruding parts 50a and 50b should be preferably longer so as to wind the coils 30 around the teeth 21 to be longer in the radial direction.

When such an insulator 50 is disposed, it is desirable that the minimum distance F between the inner periphery 222 of the back yoke 22 (see a chain line in FIG. 2) and the notch 221 with the rotation axis P as a center should be 1.5 m and above. This is because that, when this minimum distance F is small, a width of the protruding part 50b in the radial direction needs to be made thinner in order to ensure the channel for the refrigerant and the distance between the protruding parts 50a, 50b, thereby a base of the protruding part 50b at a side of the teeth 21 is easily damaged by external forces (shown by block arrows in FIG. 3) in the radial direction caused by the coils 30. The minimum distance F is understood as an absolute value of a minimum value of the difference between a length from an end 211 of each of the teeth 21 located at a side of the rotation axis P to the notch 221 in the radial direction and a length from an end 210 of each of the teeth 21 located at the opposite side of the rotation axis P to the end 211 in the radial direction.

First Variant

A rotating electric machine according to a first variant will be described. The rotating electric machine according to the first variant is identical to the rotating electric machine according to the preferred embodiment except a shape of the base 214.

Figure 4:
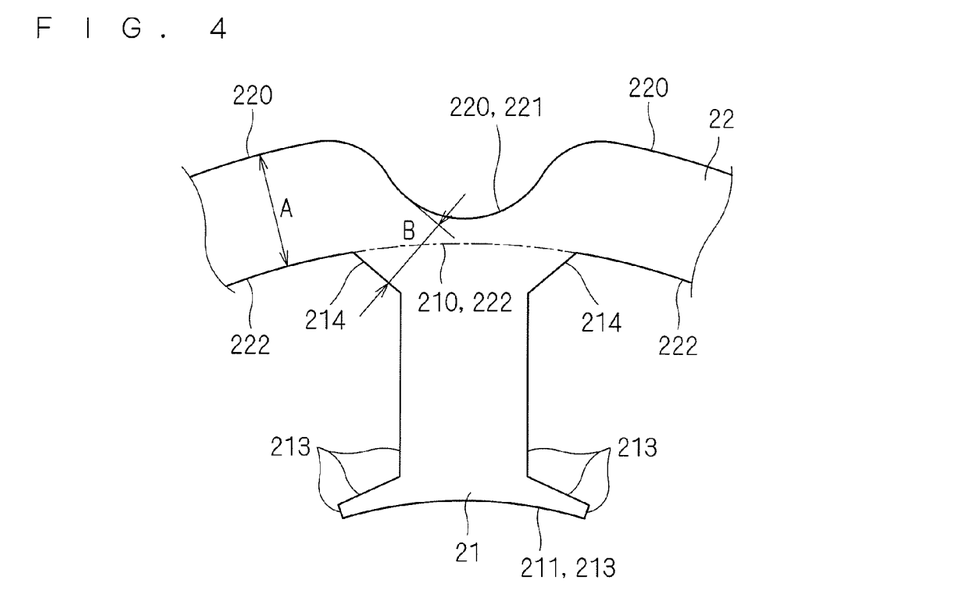
FIG. 4 is a diagram of an enlarged portion corresponding to one of the teeth in a stator core.

FIG. 4 is a conceptual diagram of a stator core 20 with an enlarged vicinity of one of the teeth 21 in the rotating electric machine according to the first variant. As shown in FIG. 4, bases 214 are chamfered. Even for this case, comparing to a case where the shape of the bases 214 is substantially right-angled, magnetic flux generated in the teeth 21 is more smoothly transferred to the back yoke 22 along the bases 214, thereby reducing iron loss of the stator core 20.

Further, by chamfering the bases 214, gaps between the coils 30 and the bases 214 are reduced. Accordingly, a ratio of a sectional area of coils (corresponding to a cross section of the coils 30 perpendicular to the rotation axis P) to a slot area (corresponding to a cross section of a space surrounded by two of the adjacent teeth 21 and the back yoke 22 perpendicular to the rotation axis P) is improved, thereby reducing copper loss.

Second Variant

A rotating electric machine according to a second variant will be described. The rotating electric machine according to the second variant is identical to the rotating electric machine according to the preferred embodiment except a shape of the base 214.

Figure 5:
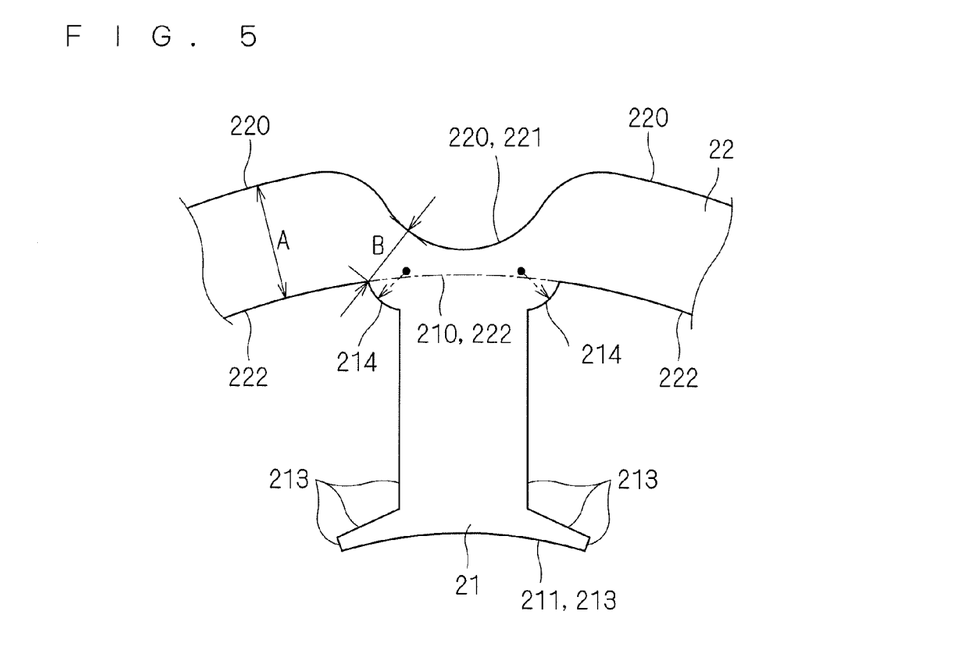
FIG. 5 is a diagram of an enlarged portion corresponding to one of the teeth in a stator core.

FIG. 5 is a conceptual diagram of a stator core 20 with an enlarged vicinity of one of the teeth 21 in the rotating electric machine according to the second variant. As shown in FIG. 5, the bases 214 are arc-shaped, and the center of the arc is at the opposite side of the teeth 21 with respect to the inner periphery 222. That is, the arc is understood as being protruding.

In this case, the magnetic path through the bases 214 is expanded, thereby suppressing the magnetic flux saturation of the teeth 21.

Third Variant

A rotating electric machine according to a third variant will be described. The rotating electric machine according to the third variant is identical to the rotating electric machine according to the preferred embodiment except a shape of the base 214.

Figure 6:
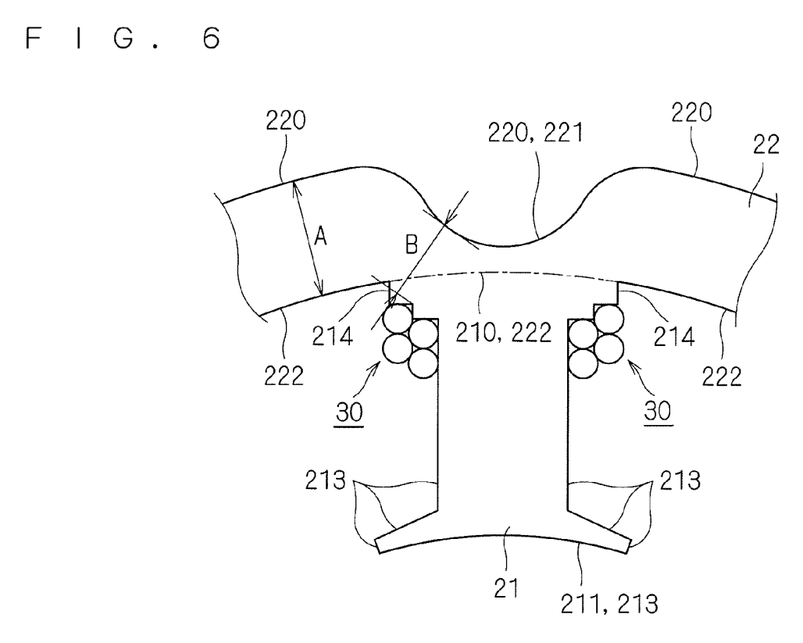
FIG. 6 is a diagram of an enlarged portion corresponding to one of the teeth in a stator core.

FIG. 6 is a conceptual diagram of a stator core 20 with an enlarged vicinity of one of the teeth 21 in the rotating electric machine according to the third variant. As shown in FIG. 6, the bases 214 are staircase shaped. In FIG. 6, the insulating films 40 are omitted, and a part of the coils 30 is shown. In this case, by winding the coils 30 around the teeth 21 along the stepwise differences, the coils 30 are easily wound around by a regular-winding method, thereby improving the space factor.

While the invention has been shown and described in detail, the foregoing description is in all aspects illustrative and not restrictive. It is therefore understood that numerous modifications and variations can be devised without departing from the scope of the invention.

What is claimed is:

1. A rotating electric machine comprising:
    a plurality of teeth circumferentially arranged around a predetermined axis forming a center of said teeth, each tooth having a first end disposed radially at an opposite side thereof from said predetermined axis;
    a back yoke having
        a circular outer periphery, and
        a cylindrical inner periphery connecting said first ends of said teeth, the outer periphery having a plurality of concave parts and a plurality of convex parts, the concave parts opening radially inwardly toward said teeth at positions overlapping with said teeth as viewed radially, at least one of the concave parts having two of the convex parts extending from respective circumferential ends of the at least one concave part, the two convex parts being symmetrical to each other with respect to a radial center line of a tooth of the plurality of teeth that is circumferentially aligned with the at least one concave part, an inflection point between a first of the two convex parts and the circular outer periphery of the back yoke being circumferentially spaced from an inflection point between the concave part and the first of the two convex parts with respect to a single circumferential side of the radial center line of the tooth circumferentially aligned with the at least one concave part, and a minimum distance measured from an exposure surface of each tooth to said concave part overlapping therewith being smaller than a radial width of said back yoke at a portion where said concave parts are not provided, said exposure surfaces extending radially inwardly of said inner periphery;

a plurality of coils wound around said teeth with concentrated-winding;

a plurality of insulating films with each insulating film interposed among said teeth, said back yoke, and said coils; and a case fixed to said back yoke by welding between an adjacent pair of said concave parts in said outer periphery.

2. The rotating electric machine according to claim 1, wherein
each tooth includes bases at a side of said back yoke that are arc-shaped, and a center of each arc-shaped base is located circumferentially between said teeth about said predetermined axis.

3. The rotating electric machine according to claim 1, wherein
each tooth includes bases at a side of said back yoke that are chamfered.

4. The rotating electric machine according to claim 1, wherein
each tooth includes bases at a side of said back yoke that are arc-shaped, and each arc-shaped base is protruding.

5. The rotating electric machine according to claim 1, wherein
each tooth includes bases at a side of said back yoke that are staircase shaped.

6. The rotating electric machine according to claim 1, wherein
a minimum distance measured between each concave part and the first end of the tooth overlapping therewith in said radial direction is at least 1.5 mm.

7. The rotating electric machine according to claim 6, wherein
said concave parts smoothly connect circumferentially to said outer periphery where said concave parts are not provided.

8. The rotating electric machine according to claim 1, wherein
said concave parts smoothly connect circumferentially to said outer periphery where said concave parts are not provided.

9. A compressor, comprising:
a compression mechanism for compressing a refrigerant; and
a rotating electric machine for driving said compression mechanism, said rotating electric machine including
a plurality of teeth circumferentially arranged around a predetermined axis forming a center of said teeth, each tooth having a first end disposed radially at an opposite side thereof from said predetermined axis,
a back yoke having
a circular outer periphery, and
a cylindrical inner periphery connecting said first ends of said teeth,
the outer periphery having a plurality of concave parts and a plurality of convex parts, the concave parts opening radially inwardly toward said teeth at positions overlapping with said teeth as viewed radially, at least one of the concave parts having two of the convex parts extending from respective circumferential ends of the at least one concave part, the two convex parts being symmetrical to each other with respect to a radial center line of a tooth of the plurality of teeth that is circumferentially aligned with the at least one concave part,
an inflection point between a first of the two convex parts and the circular outer periphery of the back yoke being circumferentially spaced from an inflection point between the concave part and the first of the two convex parts with respect to a single circumferential side of the radial center line of the tooth circumferentially aligned with the at least one concave part, and
a minimum distance measured from an exposure surface of each tooth to said concave part overlapping therewith being smaller than a radial width of said back yoke at a portion where said concave parts are not provided, said exposure surfaces extending radially inwardly of said inner periphery,
a plurality of coils wound around said teeth with concentrated-winding,
a plurality of insulating films with each insulating film interposed among said teeth, said back yoke, and said coils, and
a case fixed to said back yoke by welding between an adjacent pair of said concave parts in said outer periphery,
said refrigerant flowing through said concave part to said compression mechanism.

10. The compressor according to claim 9, wherein each tooth includes bases at a side of said back yoke that are arc-shaped, and a center of each arc-shaped base is located circumferentially between said teeth about said predetermined axis.

11. The compressor according to claim 9, wherein
each tooth includes bases at a side of said back yoke that are chamfered.

12. The compressor according to claim 9, wherein
each tooth includes bases at a side of said back yoke that are arc-shaped, and each arc-shaped base is protruding.

13. The compressor according to claim 9, wherein
each tooth includes bases at a side of said back yoke that are staircase shaped.

14. The compressor according to claim 9, wherein
a minimum distance measured between each concave part and the first end of the tooth overlapping therewith in said radial direction is at least 1.5 mm, the first ends of the teeth lying on an imaginary circle containing the circular inner periphery.

15. The compressor according to claim 9, wherein said concave parts smoothly connect circumferentially to said outer periphery where said concave parts are not provided.

\* \* \* \* \*